Sept. 1, 1964 C. A. VAN STAADEN 3,147,475
GATING SYSTEM FOR AN APPARATUS MEASURING DISTANCE
BY MEANS OF PULSE ECHOES
Filed Nov. 18, 1958 2 Sheets-Sheet 1

FIG. 1

INVENTOR.
CORNELIS AUGUSTINUS VAN STAADEN
BY
ATTORNEY

FIG. 2

United States Patent Office 3,147,475
Patented Sept. 1, 1964

3,147,475
GATING SYSTEM FOR AN APPARATUS MEASURING DISTANCE BY MEANS OF PULSE ECHOES
Cornelis A. van Staaden, Hengelo, Overijssel, Netherlands, assignor to N.V. Hollandse Signaalapparaten, Hengelo, Overijssel, Netherlands, a Dutch corporation
Filed Nov. 18, 1958, Ser. No. 774,714
Claims priority, application Netherlands Nov. 19, 1957
10 Claims. (Cl. 343—7.3)

The invention relates to a pulse synchronizing system provided with a generator for recurrent synchronizing pulses, a delay circuit with adjustable delay receiving the said pulses and reacting to such a pulse by producing a delay pulse after an adjustable delay period has elapsed, an input circuit through which recurrent pulses are applied to the system, these pulses being separated from the synchronizing pulses by an interval determined outside the system, and means for maintaining the synchronization between applied pulses and delayed pulses comprising a device comparing the moment of occurrence of the said pulses whilst they are overlapping and controlling a change in the delay of the delayed pulses, tending to maintain their synchronization with the applied pulses if the former pulses do not occur at the correct moment with respect to the latter pulses.

This type of system is generally used as gating system in radar apparatus. In these systems a fixed time relation exists between the synchronizing pulses and the transmitter pulses, e.g. because they are initiated by pulses derived from the same pulse generator, whilst the recurrent pulses applied to the system are derived from the received echo pulses by the radar receiver. The pulse with adjustable delay in these circuits is, as a rule, the first of two successive recurrent gating pulses. The second of these pulses is initiated by the trailing edge of the first one. The first gating pulse controls a first gating circuit, which is normally nonconductive, but is made conductive by the gating pulse. In the same way, the second gating pulse controls a second gating circuit. The recurrent pulses applied to the system are applied to both gating circuits and flow through such a gating circuit into an integrating circuit pertaining to the said gating circuit as far as the applied pulse coincides with the gating pulse controlling the said gating circuit. The voltage across such an integrating circuit is determined by the part of the applied pulse, which coincides with the gating pulse controlling the gating circuit which leads to the said integrating circuit, and consequently, can flow through the said gating circuit. If the proportion of the parts of the video pulses or applied pulses flowing through the two gating circuits differs from a predetermined value, the values of the voltages building up at the two integrating circuits pertaining to the two gating circuits will be unequal, and the difference between these voltages can be applied in order to control a change in the delay of the first gating pulse in such a way that the correct synchronization of the pulses is restored. In this way the delayed pulses continue to overlap the pulses applied to the system.

The delayed pulses must be synchronized with the applied pulses before the automatic regulation can be effective. For this purpose the radar apparatus is, as a rule, provided with a manually controlled device for adjusting the delay of the gating pulses and with a display screen on which the gating pulses as well as the echo pulses are shown along a time base line. An operator adjusts the delay in such a way that echo and gating pulses coincide on the screen, after which the automatic regulation of the delay is capable of maintaining the synchronization. It is a disadvantage of the method described above that the manual synchronization of the pulses requires too much time. The rate of change of the delay must be relatively low, because otherwise the operator would cause the delayed pulses repeatedly to overshoot the echo pulses. An automatic synchronization method is, therefore, preferable. It is the object of the invention to create a system capable of automatically performing this previous synchronization. In a system according to the invention the applied pulses and the delayed pulses are brought into coincidence by means of an auxiliary circuit which is able to be in one of two possible conditions, and which is brought into one of these two conditions by pulses of the one type and returns to the other condition before a new pulse of the same type occurs, the auxiliary circuit influencing the delay of the delayed pulses in the one or in the other direction, depending on whether the pulses of the other type occur while the auxiliary circuit is in the one or in the other condition.

In an effective embodiment according to the invention the auxiliary circuit is triggered into the one condition by the synchronizing pulses, and triggered into the other condition by the delayed pulses. In one embodiment synchronization is effected by causing the applied pulses to pass through one of two gating circuits, depending on the state of the auxiliary circuit and causing the delay to be influenced in one direction if these pulses pass through the first gating circuit, and in the opposite direction if the pulses pass through the second gating circuit. A very effective embodiment is obtained when the auxiliary circuit produces a varying voltage, the value of which is dependent on the condition of the circuit, and pulses derived from the applied pulses are superposed on this varying voltage and applied to a threshold circuit through which such a pulse can only pass if it is superposed on the varying voltage whilst it is at its highest value, the delay being influenced in one direction if pulses pass the threshold circuit, and in the other direction if nothing passes the threshold circuit.

According to the invention the same methods for controlling the delay can be applied if the auxiliary circuit is brought into the working condition by the delayed pulses and is automatically returned to its condition of rest after an interval which is not longer than the interval between two successive synchronizing pulses diminished by the maximum interval between a synchronizing pulse and the next applied pulse and is not shorter than the latter interval.

In another embodiment according to the invention the auxiliary circuit is brought into the one condition by the delayed pulses and into the other condition by the applied pulses. In this embodiment the delay is preferably regulated by causing the circuit to produce a voltage of one value when it is in the one condition, and a voltage of another value when it is in its other condition. The average value of this varying voltage is determined by the system and the delay is changed in the one or in the other direction, depending on whether this average voltage is below or above a predetermined value.

Preferably the auxiliary circuit is automatically switched off as soon as pulses of sufficient strength flow through at least one gating circuit.

In many cases radar apparatus are provided with two gating systems. The first gating system permits a rapid adaptation fo the moment of occurrence of the gating pulses, owing to the fact that the delay is electronically controlled. This gating system is applied in order to permit automatic following of a target as soon as it has been found. Since the autofollow control system is unable to discriminate between echoes received from targets at different ranges, it is desirable to restrict the received echoes as soon as possible to echoes caused by targets situated adaptation of the moment of occurence of the gating An electronically controlled gating system is suitable for such quick operation. On the other hand the gating system is used for effecting accurate range measurements, and the electronically controlled gating system is not very suitable for this purpose. For this purpose it is preferable to apply a gating system in which the delay of the gating pulses is determined by means of a mechanically driven voltage divider. This type of mechanically controlled gating system has the disadvantage that the rate of change of the moment of occurrence of the gating pulses, which is restricted by the maximum driving speed of the voltage divider, is relatively low, so that it takes a long time for the gating pulses to be synchronized with the echo pulses. Moreover, accurate range measurement is only required for ranges which are much smaller than the maximum range at which automatic following of a target is still possible. The accuracy of range measurements, however, is a percentage of the maximum range, and it is obvious that it is undesirable for the maximum range of the mechanically controlled gating system, which is used for accurate range measurements to be larger than the largest range at which accurate measurements are still required. These are the reasons why radar apparatus, as a rule, are provided with two gating systems. It would be possible to synchronize echo pulses and gating pulses in both systems by means of an auxiliary circuit according to the invention. In this case, however, the two gating systems may be synchronized with echoes received from different targets, for it it very well possible that the mechanically controlled gating system could become synchronized with the echo of a target which has entered the beam after the synchronization of the electronically controlled gating system. To make certain that both gating systems are synchronized with the echo pulses received from the same target, according to the invention the gating pulses of the mechanically controlled gating system are synchronized with the gating pulses of the electronically controlled gating system, the latter pulses having already been synchronized with the echo pulses. For this purpose, according to the invention the pulses applied to the system occur in the interval during which the gating pulses of an electronically controlled gating system of a radar apparatus occur, whilst delayed pulses occur in the interval during which the gating pulses of the mechanically controlled gating system of the same radar apparatus are provided. Preferably the auxiliary circuit which effects the synchronization of the two gating systems is automatically caused to effect the synchronization of the two gating systems as soon as echo pulses flow through at least one of the gating circuits of the electronically controlled gating system, while it is switched off as soon as a device comparing the moment of occurrence of the gating pulses of the two gating systems establishes that both pulses overlap. Preferably the same auxiliary circuit is applied for synchronizing the electronically controlled gating system with the echo pulses as is applied for synchronizing the mechanically controlled gating system with the electronically controlled gating system.

In some cases it may be desirable to use the auxiliary circuit according to the invention for the purpose of synchronizing the electronically controlled gating system with the mechanically controlled gating system. If, for instance, the automatic control of the delay in both gating systems is seriously hampered by fading or by ground echoes, manual control of the delay may be used. An operator then maintains the coincidence of echoes and gating pulses by means of the display of these pulses on a radar screen. Preferably this manual control is effected in the mechanically controlled gating system in which the voltage divider can be driven manually. The echoes with which the mechanically controlled gating system is synchronized must, however, also flow through the gating circuits of the electronically controlled gating system, because these echoes must be applied to the automatic volume control system and to the autofollow system of the radar antenna. The electronically controlled gating system must, therefore, be synchronized with the manually controlled gating system, for which purpose, according to the invention, an auxiliary circuit as described above synchronizes the gating pulses of the electronically controlled gating system with the gating pulses of the mechanically controlled gating system.

Figure 1:
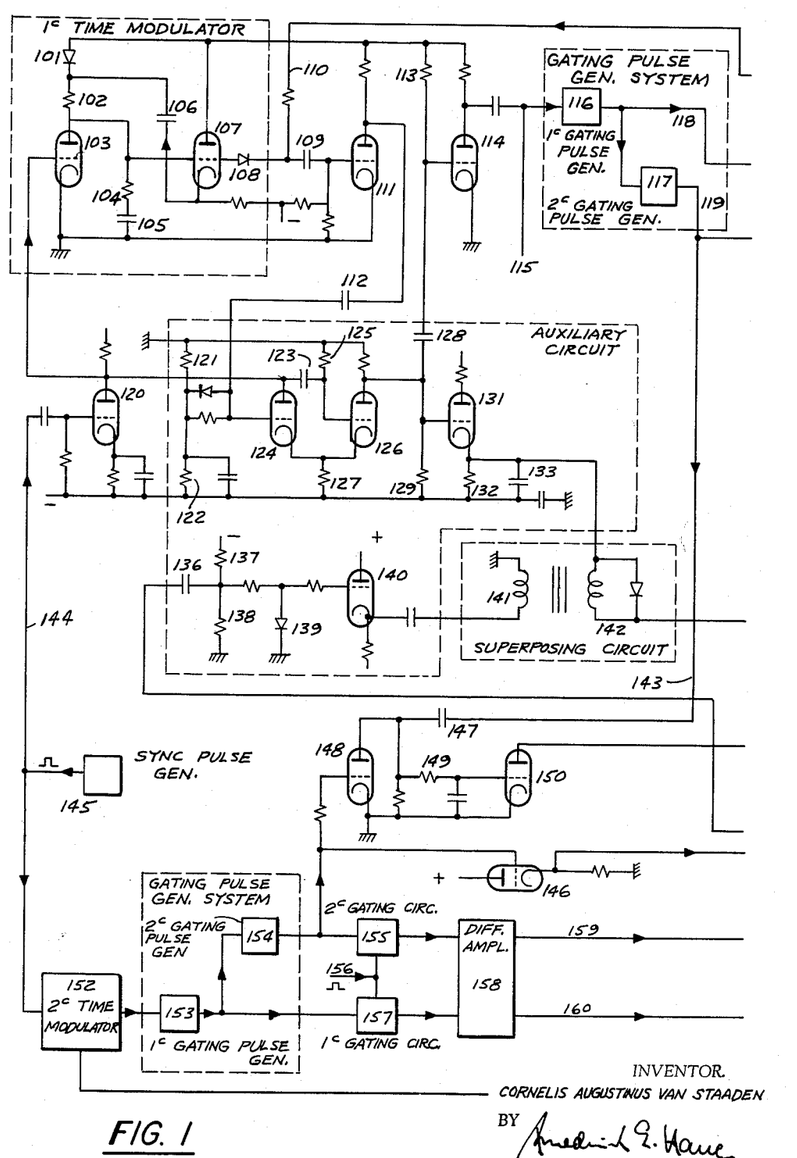
Figure 2:
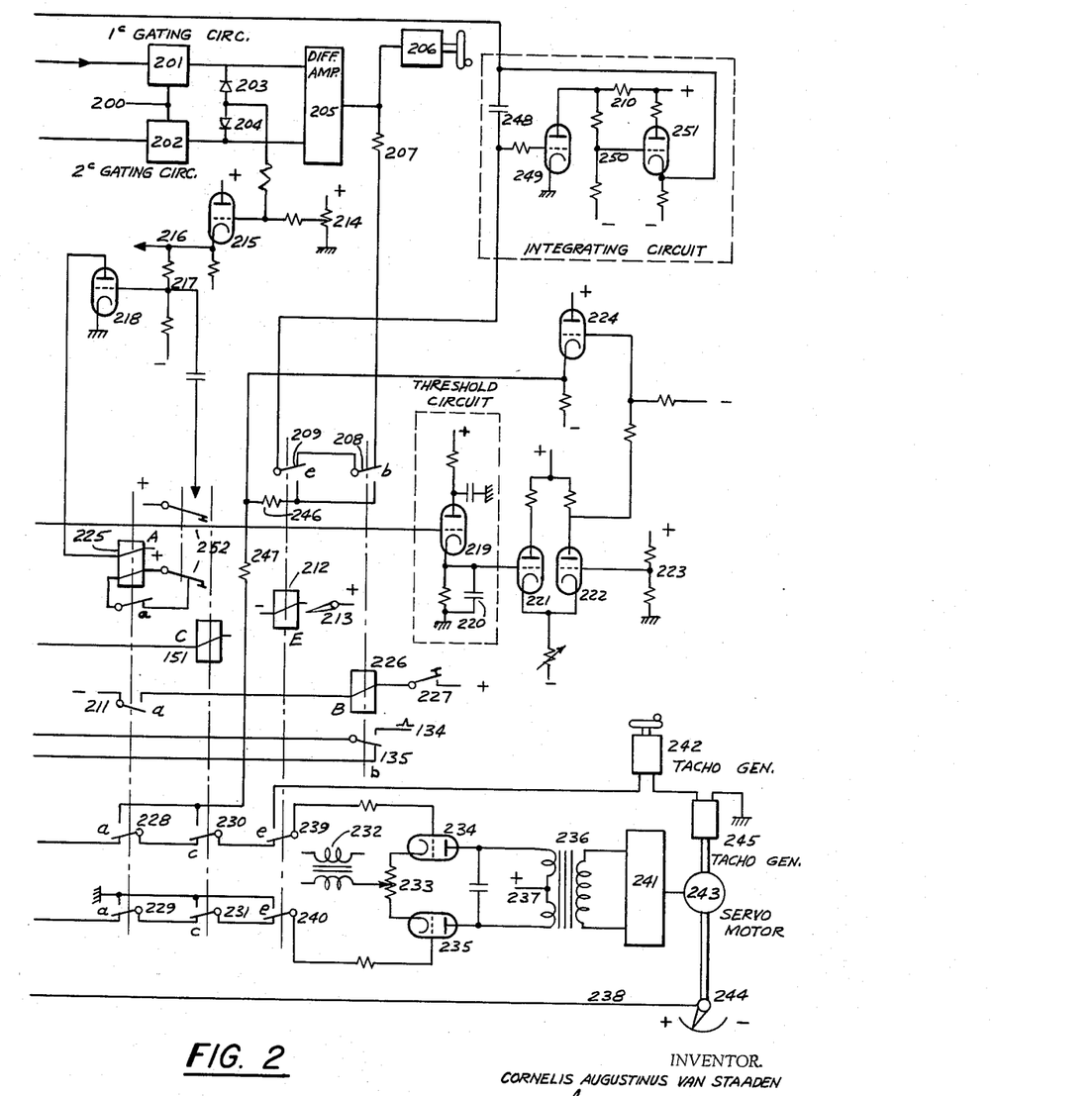

An embodiment according to the invention will now be described with reference to the drawings. FIGS. 1 and 2 show the left and right hand parts of the circuit of a gating pulse system according to the invention. The upper part of the combined drawings shows an electronic gating pulse system, whilst the lower part of these drawings shows a gating pulse system controlled by means of a mechanically driven voltage divider. Between these parts the auxiliary circuit according to the invention and the circuit elements which put this auxiliary circuit into and out of operation are represented. Narrow positive synchronizing pulses are applied to the terminal 145 and flow through the connection 144 to the grid of the tube 120, causing this grid to become positive, so that the anode current of the tube increases and the anode voltage decreases. The latter voltage decrease is applied, by way of condenser 123, to the grid of the normally conductive tube 126, causing the anode current in this tube to be cut off. The anode voltage increase resulting therefrom has no direct effect. The current decrease in the cathode resistance 127 causes, however, a decrease of the potential of the cathode of the tube 124. This tube has a constant grid potential provided for by the voltage divider 121, 122, and the potential decrease of its cathode will cause this cathode to become negative with respect to the grid, so that this normally non conductive tube will become conductive causing the decreased anode potential of the tube 120 to be maintained. The grid potential of the tube 126 will also remain low, owing to the fact that the circuit consisting of the resistance 125 and the condenser 123 has a relatively large time constant. The value of this time constant is such that in the absence of extraneous influence, it is then certain that the tube 126 will not become conductive before the next synchronization pulse. The anode potential of the tube 120 is equal to the grid potential of the tube 103, and the decrease of this potential, initiated by the synchronizing pulse will cause anode current in the normally conductive tube 103 to be cut off. The tube then no longer short-circuits the condenser 105, which, from this moment on, is charged in a circuit comprising the resistances 102 and 104. The condenser voltage should be a linear function of time and for this reason its charging circuit is a boot-strap circuit. The voltage on the series circuit comprising the resistance 104 and the condenser 105 is, for this purpose, applied to the grid of the cathode follower 107. The cathode of this tube is connected by way of a large condenser 106, to the upper terminal of the resistance 102 in the charging circuit of the condenser 105 so that the increase of the cathode voltage of the cathode follower, resulting from the increase of the voltage across the terminals of the condenser 105, is transferred to the said upper terminal, causing the rectifier 101 to become non-conductive and the voltage across the terminals of the resistance 102 to remain constant. The charging current of condenser 105, now provided by the condenser 106, and flowing through the said resistance will then also remain constant, so that the voltage across the terminals of the condenser 105, which is considerably smaller than the condenser 106, will increase virtually as a linear function of time. This linearly increasing condenser voltage is compared with a control voltage applied to the connection 110, and as soon as the condenser voltage exceeds this control voltage, the rectifier 108 becomes conductive, causing a positive pulse to be applied to the grid of the tube 111 by way of the condenser 109. The negative pulse then occurring at the anode of this tube is applied by way of the condenser 112 to the grid of the tube 124 which at that moment is conductive. Its anode current will be cut off as a result of the said negative pulse. This causes a sudden increase of the anode voltage of this tube which is applied to the grid of the switching tube 103, causing it to become conductive and the condenser 105 to be discharged through this tube. The cycle of operation of the boot-strap saw-tooth generator is then completed. The increase of the anode voltage of tube 124 is also applied by way of the condenser 123 to the grid of the tube 126, causing this tube to become conductive again. Its anode current causes such a voltage drop in the cathode resistance 127 that the grid of the tube 124 remains negative with respect to its cathode and the tube remains in the cut off state after the termination of the pulse furnished by the tube 111. When the tube 126 becomes conductive, this results in a sudden decrease of the anode potential of this tube. This potential decrease is applied by way of condenser 128 to the grid of the amplifier tube 114, causing this tube to furnish on the one hand a positive pulse to the gating pulse generator 116 and on the other hand, a similar pulse via the connection 115 to the circuit of the display tube on which the echo and gating pulses are shown. The duration of the gating pulse is determined by the time constant of the RC circuit comprising the resistance 113 and the condenser 128, situated in the grid circuit of the tube 114. As soon as the gating pulse generator 116 receives the pulse from the amplifier tube 114 its produces a gating pulse which it applies to the gating circuit 201 and to the second gating pulse generator 117. The second gating pulse generator 117 is made operative by the trailing edge of the gating pulse and then furnishes the second gating pulse via the connection 119 to the second gating pulse circuit 202. The radar receiver receives echo pulses and transforms them into video pulses, applying them to the gating circuits 201 and 202 via the connection 200. If the gating pulses overlap the video pulses a part of every video pulse will flow through the gating circuit 201 to one integrator circuit, while another part of the same video pulse will flow through the other gating circuit 202 to a second integator circuit. The charges passing through the two gating circuits 201 and 202 are integrated in the integrator circuits, causing output voltages to be built up in these integrator circuits. These output voltages will be equal in the case of one relative moment of occurrence of video pulses and gating pulses. In the case of all other relative moments of occurrence the output voltages of the integrator circuits will be unequal. The sign of the difference between these voltages is determined by the direction of the deviation from the relative moment of occurrence at which equal voltages are produced by the integrators. The voltage difference is applied to and amplified by the differential amplifier 205 which applies the amplified voltage by way of resistance 207 and the relay contacts b208 and e209 to an integrator circuit 210 which integrates it with respect to time the integration result being a voltage applied to the conductor 110. The rate of change of this voltage is determined by the output voltage of the differential amplifier. The integrating circuit could consist of one single condenser, charged by the output voltage of the differential amplifier via the resistance 207, and connected between the conductor 110 and earth, but, for various reasons, is, as a rule, a more complicated circuit, such as a Miller circuit. The potential of the conductor 110 determines by its value the moment of occurrence of the first gating pulse, because this potential determines the moment at which the rectifier 108 becomes conductive and at which the tube 111 produces a pulse which returns the trigger circuit comprising the tubes 124 and 126, to its state of rest. If no voltage is provided by the differential amplifier, the voltage produced by the gating circuit 201, as well as the moments of occurence of the gating pulses, remains unchanged. If the amplifier does produce a voltage, the control voltage produced by the gating circuit 201 changes in a sense determined by the sense of the deviation from the correct relative moment of occurrence of the video pulses and gating pulses established by the gating circuit.

A manually controlled device 206 is applied to effect the initial synchronization of gating pulses and video pulses. If the handwheel of this device is in its position of rest the device does not produce any voltage. This should be the case when the automatic regulation of the delay of the gating pulses is operative. If the handwheel is rotated out of its position of rest, the device 206 provides a voltage the sign and magnitude of which are determined by the direction and magnitude of the rotation of the handwheel. This voltage is applied to the integrating circuit 210, and in this way causes the output voltage of this integrating circuit and the moment of occurrence of the gating pulses to be changed. The synchronization of the gating pulse by manual control is however, slow. The auxiliary circuit according to the invention permits a rapid and automatic synchronization. In the embodiment described, the trigger circuit comprising the tubes 124 and 126 forms a part of the said auxiliary circuit. This trigger circuit is brought into a condition in which the tube 124 is made conductive by means of every synchronizing pulse, and is brought into a condition in which the tube 126 is conductive at the moment of occurrence of the first gating pulse. By means of the tube 131 the trigger circuit furnishes a voltage of one value to the conductor 142 when the circuit is in its one condition and a voltage of another value when it is in its other condition. For this purpose the grid of the tube 131 is coupled to the anode of the tube 126, and has a low potential when the trigger circuit with the tubes 126 and 124 is in its state of rest and the tube 126 is conductive, whereas the said grid has a high potential during the interval during which the trigger circuit is in its operative condition after the reception of a synchronizing pulse. The tube 131 is a cathode follower, so that its cathode potential will correspond to its grid potential, and the conductor 124 will have a high potential after the synchronizing pulse has been received and a low potential as soon as the first gating pulse after this synchronizing pulse has been produced. By way of the conductor 134 video pulses are applied to the auxiliary circuit and flow by way of contact b135 which is at that moment in the position not shown, as will be elucidated later, and by way of the condenser 136 to the grid of the cathode follower 140. A voltage divider 137, 138 causes these video pulses to be superposed on a fixed D.C. voltage determined by the said voltage divider, while a rectifier 139 operates as a limiter and causes the said pulses to have a constant amplitude. The cathode follower 140, therefore, reproduces every video pulse as a pulse of a predetermined amplitude at the primary winding of the transformer 141. The secondary winding of this transformer superposes these pulses on the varying potential furnished by the trigger circuit with the tubes 124 and 126. This combined voltage is applied to the grid of the tube 219 working as a threshold tube. The varying voltage produced by the trigger circuit with the tube 124 and 126 remains negative, even when it is at its highest value and only when a video pulse is superposed on the said varying voltage while it is at its highest value, will the grid of the threshold tube become positive and will the said tube become conductive. The tube 219 is, moreover, a cathode follower. Its cathode resistance is bridged by a condenser 220 which operates as a memory circuit. When the video pulses cause the grid of the tube 219 to become intermittently positive the condenser 220 will be charged, and it is large enough to retain its charge between successive pulses. If the video pulses no longer pass the threshold tube 219, the condenser 220 will discharge through the cathode resistance and, after a few cycles of the video pulses, will have lost its charge. The voltage across condenser 220 is applied to the grid of the tube 221 which, together with the tubes 221 and 222, forms part of a differential amplifier. Consequently, if the video pulses occur before the gating pulses and the video pulses are superposed on the varying voltage wave while it is at its highest value, the grid of tube 221 becomes positive. The said grid remains at zero potential if the video pulses occur after the gating pulses and are superimposed on the varying voltage wave while it is at its lowest value. The differential amplifier compares the potential of the cathode of the tube 219 with the fixed potential applied to the grid of the tube 222 by means of the voltage divided 223. If, on the other hand, the grid voltage of the tube 219 remains negative, the condenser 220 will discharge through the cathode resistance of the cathode follower 219, and, within a few cycles of the video pulses, the condenser voltage will be restored to zero. The condenser voltage is applied to the grid of the tube 221 of the differential amplifier, which compares the condenser voltage with the constant voltage applied to the grid of the tube 222. If the video pulses occur while the voltage provided by the time modulator by means of the tube 131 is high, i.e. before the occurrence of the gating pulses, the grid of the tube 219 will be positive during every video pulse, causing the grid of the tube 221 to have a higher potential than that of the tube 222, so that the tube 221 becomes conductive. This tube operates as a cathode follower and has a common cathode resistance with the tube 222. While the tube 221 is conductive, the cathodes of both tubes will have a voltage corresponding to the grid voltage of the former tube. This grid voltage is higher than the grid voltage of the tube 222, and while tube 221 is conductive, the grid of the tube 222 will be negative with respect to its cathode, causing this tube to be cut off. If, on the other hand, the condenser voltage is zero, the cathodes of the tubes 221 and 222 will have the same fixed potential as the grid of the tube 222, causing the grid of the tube 221 to be negative with respect to its cathode, so that this tube will be cut off and the other tube will be conductive. The anode voltage of the tube 222 is the output voltage of the differential amplifier and controls the grid of the cathode follower 224. When the video pulses occur before the gating pulses and the grid of tube 221 becomes positive, there is an increase in its anode current and in the voltage drop in the common cathode resistance of the tubes 221 and 222 of the differential amplifier. The tube 222 has a constant grid potential, so that the increase of its cathode voltage will cause a reduction in its anode current and therefore an increase in its anode voltage, and in the cathode voltage of the tube 224 controlled by the said anode voltage. If, on the other hand, the video pulses occur after the gating pulses and are unable to pass the threshold tube 219, so that the grid of the tube 221 has zero potential, the cathode voltage of the tubes 221 and 222 will remain low, so that the tube 222 carries a heavy anode current and has a low anode potential, causing the cathode voltage of tube 224 to remain low. As the anode of tube 224 is connected to a point of positive potential and its cathode to a point of negative potential, its cathode potential swings from positive through zero to negative, when the relative moment of occurrence of video and gating pulses changes.

During the operation of the auxiliary circuit, at least one of the contacts $b208$ or $e209$ is switched over to the position not shown, so that the cathode voltage of the tube 224 is applied to the integrating device 210 by way of the resistance 246. The cathode voltage of the tube 224 will, therefore, influence the output voltage of the integrator circuit 210 as well as the moment of occurrence of the gating pulses determined by this voltage. If the gating pulses occur too late, the cathode voltage of tube 224 is positive and causes the grid voltage of the tube 249 in the Miller integrator 210 to increase slightly, so that its anode voltage, which controls the grid of the cathode follower 251 as well as the cathode voltage of this cathode follower, decreases. The rate of this change is, however, limited by the condenser 248, which must be charged through resistance 246 by a voltage which is equal to the difference of the voltages of the grid of the tube 249 and the cathode of the tube 251, in this way causing an integration with respect to time to be effected. The decrease in the cathode voltage of the tube 251 causes the operation of the bootstrap generator in the time modulator to be stopped earlier, causing the gating pulses to be shifted to an earlier moment. If the gating pulses occur too early the threshold tube 219 remains non conductive and the grid voltage of the tube 221 remains at zero. The cathode follower 224 then provides a negative voltage to the Miller integrator, causing the output voltage of this integrator to be increased and the moment of occurrence of the gating pulses to be shifted to a later moment. In the radar apparatus described the auxiliary circuit is applied in the first place for searching a target. As will be shown later, the relay A225 is excited during searching when the pressing button contact 227 is closed, because it is necessary for the operator to press this button in order to switch the apparatus to searching. The relay B226 then becomes excited in a circuit comprising the contact 227 and the front contact $a211$ of the relay A225, and connects the Miller integrator 210 by means of contact $b208$ to the cathode of the cathode follower 224, when the change over contact $b135$ connects the grid of the cathode follower 140 to a source of video pulses. The auxiliary circuit will then operate as described above, causing the synchronization of the gating pulses with the echo pulses of the nearest target. The resistance 246 is considerably lower than the resistance 207 through which the differential amplifier 205 controls the Miller integrator 210. This permits a rapid change in the output voltage of the Miller integrator and a rapid synchronization of the gating pulses. The complete synchronization may be effected within an interval of a few milliseconds after the moment of occurrence of the first video pulse. When the synchronization has been effected and the video pulses and gating pulses are overlapping, the video pulses will flow through the gating circuits 201, and 202, so that a negative voltage builds up at the output circuits of these gating circuits. The largest of these negative potentials causes one of the rectifiers 203 or 204 to become conductive and is therefore applied to the grid of the cathode follower 215. The potential of rest of this grid is determined by a voltage divider 214. Its cathode voltage is conveyed by the conductor 216 to the control circuit for the autofollow operation and the device for automatic volume control, and applied, by means of the voltage divider 217, to the grid of an amplifier tube 218. As soon as a negative voltage builds up as a result of video pulses passing the gating circuits, the grid potential of the tube 218 will be decreased. This causes the anode current of this tube to decrease, so that the armature of the relay A225 returns to this position of rest. This relay is in the operative position as long as no video pulses pass the gates and the grid potential of the tube 218 corresponds to the state of rest. This relay is of the type that picks up slowly but releases rapidly. In the embodiment shown on the drawings it possesses, for this purpose, a second winding, which is short-circuited by its own back contact when the relay is released. As soon as the armature of the relay A225 is released, the contact $a211$ is opened, and breaks the energizing circuit of the relay B226, so that this relay also releases its armature, and the contact $b208$ is switched over, causing the Miller integrator to be disconnected from the auxiliary circuit and connected to the output circuit of the differential amplifier 205. From this moment on the gating system itself controls the range autofollow of the gating pulses. After the electronic gating pulse system has been synchronized with the echo pulses, the mechanically controlled gating circuit must be synchronized with the echo pulses of the same target. When the relay B226 releases its armature, a change over contact b135 returns to its position of rest. Instead of video pulses fed to the auxiliary circuit via conductor 134, the second gating pulse of the mechanically controlled gating system is then applied to the grid of the cathode follower 140 by means of the cathode follower 146. This second gating pulse is then superposed on the voltage wave produced by the cathode follower 131 and by the time modulator. The mechanically controlled gating pulse system comprises a time modulator 152, which receives synchronizing pulses through the conductor 145. The said time modulator reacts to these synchronizing pulses by producing trigger pulses for the first gating pulse generator 153. The delay between these trigger pulses and the synchronizing pulses is determined by the potential of the conductor 161. The first gating pulse produced by the gating pulse generator 153 is applied to the first gating circuit 157 as well as to the second gating pulse generator 154, which reacts to the trailing edge of the first gating pulse by generating the second gating pulse and applying this gating pulse to the second gating circuit 155. Both gating circuits receive the video pulses produced by the radar receiver through the conductor 156. As has been described above for the electronically controlled gating system, the gating circuits produce voltages which are dependent on the part of the video pulse flowing through them. These voltages are applied to a differential amplifier 158, which applies the amplified difference of the said voltages to the conductors 159 and 160. Although the relay A225 was released at the moment at which the electronically controlled gating pulses were synchronized with the video pulses, so that the contacts a228 and a229 are in their positions of rest, the output voltage of differential amplifier 158 is still unable to reach the modulator with the tubes 234 and 235, owing to the fact that the relay C151 is still excited, causing its change-over contacts c230 and c231 to be in the operative positions. When this is the case the modulator is controlled by the output voltage of the cathode follower 224 of the auxiliary circuit. If the second mechanically controlled gating pulse occurs before the electronically controlled gating pulses and is consequently superposed on the voltage wave produced by the cathode follower 131 while this voltage is at its highest value, a positive voltage will be applied to the modulator of the mechanically controlled gating system by the cathode follower 224. If, on the other hand, the second mechanically controlled gating pulse occurs later than the electronically controlled gating pulses, cathode follower 224 applies a negative voltage to the modulator. The contact c230 being in its operative position, the voltage of the cathode of the cathode follower 224 is applied to the grid of the modulator tube 234, while contact c231 in its operative position applies earth potential to the grid of the other modulator tube 235. The transformer 232 applies an alternating voltage to the cathodes of the two modulator tubes by way of voltage divider 233. It depends on the sign of the difference between the voltages of the modulator tube grids whether the alternating current in the tube 234 or the alternating current in the tube 235 will be strongest. These alternating currents flow in opposite directions through equal parts of the primary winding of the transformer 236 to the point 237, so that the phase of the alternating voltage induced in the secondary winding of this transformer is determined by the sign of the voltage applied by the cathode follower 224 to the grid of the modulator tube 234, and, as the said cathode voltage is determined by the relative moment of occurrence of the second mechanically controlled gating pulse and the electronically controlled gating pulses, this relative moment of occurrence will eventually determine the phase of the said alternating voltage. The output voltage of the secondary winding of the transformer 236 controls the servo motor 243 by means of the modulator and servo amplifier 241. The direction of rotation of this servo motor is determined by the phase of the said voltage, and consequently by the relative moment of occurrence of the said gating pulses. The servo motor drives the adjustable contact of a voltage divider 244, which furnishes the control voltage of the time modulator 152 of the mechanically controlled gating system. When it is controlled by the cathode voltage of the cathode follower 224 the servomotor drives the voltage divider in such a direction that the moment of occurrence of the mechanically controlled gating pulses is shifted in the direction of the moment of occurrence of the electronically controlled gating pulses. A discriminator circuit comprising the tubes 148 and 150 and the relays C131 establishes the synchronization of the gating pulses of both types. The grid voltage of the second gating tube of the mechanically controlled gating system is, for this purpose, applied to the grid of the tube 148 so that the latter grid is negative, except during the second mechanically controlled gating pulse during which it is positive. The second electronically controlled gating pulse is applied to the anode of the tube 148, so that this tube will only be conductive if the second gating pulses of both gating systems overlap. As long as this is not the case no current flows in the anode circuit of the tube 148. Grid and cathode of the tube 150 will then have the same potential, so that anode current flows through this tube, causing relay C151 to be excited. This relay then connects the modulator with the tubes 234 and 235 to the cathode follower 224 of the auxiliary circuit. As soon as the second gating pulses of both gating systems overlap, current flows in the anode circuit of the tube 148, causing the condenser 147 to be charged, so that the anode obtains a negative voltage during the interval between pulses. This potential is applied to the grid of the tube 150 through a low pass filter 149, which maintains the negative grid voltage of the tube 150 during the pulses. The relay C151 is then released and returns its contacts c230 and c231 to their positions of rest, in which they disconnect the modulator from the auxiliary circuit and connect it to the output voltage of the differential amplifier 158, after which the mechanically controlled gating pulses will automatically follow the video pulses applied to the mechanically controlled gating system via the terminal 156. Should the synchronization of the two gating circuits for any reason become broken, this relay C151 is immediately energized. The auxiliary circuit is then once more connected to the modulator of the mechanically controlled gating system, and the automatic synchronization operation is repeated.

While the electronically controlled gating system is being synchronized the relay A225 is still excited, and by means of the contacts a228 and a229 keeps the modulator circuit with the tubes 234 and 235 disconnected from the output circuit of the differential amplifier 158, independently of the state of relay C151. During the synchronizing operation of the electronically controlled gating system the modulator thus receives the control voltage applied to the Miller integrator of this electronically controlled gating system by the auxiliary circuit. This voltage will cause the motor 243 to drive the voltage divider 244; this motion serves no purpose but, as it is of short duration and, therefore, unable to cause a substantial change in the adjustment of the voltage divider, it causes no hindrance. No measures are taken to prevent this arbitrary motion of the voltage divider.

When sufficiently strong echoes are no longer received, the reaction of the apparatus must depend on the duration of the disappearance or of the fading of the echoes. If no echoes are received as a result of a fading of longer duration or because the target has flown away, the system should be prepared for the searching and following of another target. If, on the other hand, the absence of echoes is of short duration, so that it may be expected that when the echoes are received again the echo and gating pulses will be found to be still synchronized, the installation should not react to the absence of echoes. If no further echoes are received, the grid potential of the cathode follower 215 and the cathode voltage of this tube return to their value of rest, determined by the voltage divider 214. The grid of the tube 218 then becomes less negative and the anode current of this tube increases. The relay A225, however, picks up slowly, and its armature will not return to its operative condition unless a certain delay period has elapsed. The anode current of tube 218 decreases as soon as echoes are received again, and if at that moment the armature of the relay A225 has still not reached its operative position, it will remain in its released position, so that the gating pulse system can continue its normal operation. Consequently the apparatus does not react to temporary fading, but if the absence of echoes continues for too long a period, so that the synchronization of echo and gating pulses may be expected to be definitely lost, the relay A225, the delay of which has a value which is determined for this purpose, attracts its armature again. If the apparatus possesses a hold rate circuit the relay A225 should remain in the released state as long as this hold rate circuit is operative. The attracting of the armature of the relay A225 indicates that, the apparatus considers the target as lost. The front contact $a211$ prepares a circuit by means of which the operator may excite the relay B226 for the purpose of starting the search for a new target. The contacts $a228$ and $a229$ are, moreover, switched over, disconnecting the modulator controlling the motor 243 from the output circuit of the differential amplifier of the mechanically controlled gating pulse system, and connecting this modulator to the cathode follower 224 of the auxiliary circuit, while the contact $b135$ remains in its position of rest, so that the mechanically controlled gating system is automatically synchronized with the electronically controlled gating system. This has the following object. If a gating system is left uncontrolled while on echoes are received, small deviations from symmetry in the circuit and small differences between the durations of the gating pulses will cause the moment of occurrence of the gating pulses to be slowly changed. As soon as this slow drift of the pulses causes the electronically controlled pulses and mechanically controlled pulses to become unsynchronized, the relay C151 is excited, causing, as described above, a rapid synchronization of the two gating systems by the auxiliary circuit, after which the relay C151 becomes de-energized and remains so until the synchronization is once more disturbed by the drift. This operation is repeated indefinitely, and causes wear of the relay C151 and of further parts. It is prevented by the presence of the contacts $a228$ and $a229$ which cause the auxiliary circuit to maintain the synchronization of the gating systems as long as no echoes are received and no searching operation is started by the pressing of button 227 by the operator. It is impossible for the voltage wave provided by the cathode follower 131 to change abruptly from its highest to its lowest value, but it will change according to a steep but still continuous function. Consequently the auxiliary circuit controls the mechanically controlled gating system in a more or less stable way; it will cause no oscillations of the motor 243.

It may happen that the echo of a target becomes too weak to control an autofollow circuit, but is still strong enough to be seen on the screen of the apparatus on which the gating pulses are also shown. Gating pulses and echo pulses may then be kept synchronized by means of manual control. The maximum range of the electronically controlled gating system is, as a rule, considerably larger than that of the mechanically controlled gating system. In this way two different situations may occur. The electronically controlled gating system can be synchronized with echoes from targets at the longest range at which the radar apparatus is still able to receive echoes visible on the screen. The echo pulses passing through the gating circuits of this gating system, therefore, are applied to control devices for automatic following and automatic volume control which must be able to operate for targets situated at the longest attainable range. The mechanically controlled gating system is principally used as a means for an accurate range measurement. Such accurate range measurements are, as a rule, only necessary for targets situated at a much shorter range. It is, therefore, undesirable to build a mechanical gating system for the largest range attainable by the radar apparatus, for the accuracy of measurement of a gating system is a percentage of the maximum range, so that the range error is proportional to this maximum range. Radar apparatuses have been built in which the electronically controlled gating system has a maximum range of 50 km., while accurate range measurements need only be effected within a range of 20 km., so that the mechanically controlled gating system has a maximum range of 20 km. If manual control is desirable and the target is situated outside the range of the mechanically controlled gating system, then the electronically controlled gating system will be manually controlled by applying a voltage to the integrator circuit by means of the voltage divider 206, which is adjusted by means of a handwheel. If, on the other hand, the target is within the range of the mechanically controlled motor driven gating system, then it is especially desirable to adjust this gating system with the greatest accuracy, because in this case accurate range measurements should be effected. It would then be preferable to apply the manual control to the motor driven gating system. An example of a circuit according to the invention in which both the electronically controlled and the motor driven gating system are provided with means for manual control is shown in FIG. 2. If it is desired to control the motor driven system manually, then the switch 213 is thrown, causing a relay E212 to be excited. This relay switches over the contacts $e239$ and $e240$, establishing a connection between the modulator with the tubes 234 and 235 and the tacho generator 242, so that the servo motor can be controlled through rotating the said tacho generator by means of the handwheel. If this tacho generator is rotated the difference between the voltage of the tacho generator 245 driven by the servo motor, and the manually driven tacho generator 242, is applied to the grid of the tube 234 of the modulator, causing the servo motor to be driven in such a direction and with such a speed that the two tacho generator voltages are practically equal and of opposite polarity. The servo motor and the handwheel will then rotate at corresponding speeds and effect corresponding angular rotation. It is, however, absolutely necessary that the electronically controlled gating system should also remain synchronized with the echoes of the target because the automatic volume control must remain operative, and the automatic volume control is operated by pulses flowing through the gating circuits of the electronically controlled gating system. Moreover, although the echo pulses may be too weak to be used in the direction autofollow system and the antenna has to be aimed manually, an indication of the directional error is none the less required in order to permit this manual aiming and, as a rule, this indication is derived from the autofollow system which must obtain its information from the electronically controlled gating system, because the indication of a target on the screen and the autofollow operation must both remain possible, even if the target is beyond the maximum range of the mechanically controlled gating system. The synchronization of the electronically controlled gating system during manual control of the motor driven gating system is also desirable in order to permit a direct switch over to autofollow as soon as the echoes become stronger. In the radar apparatus described, only the gating pulses of the electronically controlled gating system are shown on the screen, for which purpose the pulse provided by the tube 114 to the first gating pulse generator is applied to the cathode ray tube of the display screen of the radar apparatus by way of conductor 115. During manual control the relay B226 remains in its released state, so that back contact b135 is closed. The auxiliary circuit now compares, in the same way as described for the synchronization of the mechanically controlled gating system, the moment of occurrence of the mechanically controlled gating pulses and of the electronically controlled gating pulses, causing a positive voltage to be provided by the cathode follower 224 if the second gating pulse of the electronically controlled gating system occurs later than the second gating pulse of the mechanically controlled system, while a negative voltage is provided if the sequence of these pulses is reversed. This voltage cannot reach the modulator with the tubes 234 and 235, for the contacts e239 and e240 are in their working positions. The mechanically controlled gating system will not, therefore, be controlled by this voltage. The front contact e209, however, applies this voltage to the Miller integrator 210, so that the electronically controlled gating system is synchronized with the gating pulses of the mechanically controlled gating system. For this purpose the auxiliary circuit operates in the same way as during the synchronization of the electronically controlled gating pulses with received echo pulses. The said control is stable because the voltage wave produced by the time modulator by means of the cathode follower 131 does not show a discontinuous step, but, as a result of the influence of condenser 133, shows a continuous change during a small, but not infinitely small, period. The duration of this period is of the same order as the duration of the gating pulses. The comparison system comprising the tube 150 also compares the moment of occurrence of the second gating pulses of the two gating systems, whilst the motor driven system is manually controlled, but it is unable to influence the operation of the system, because the input circuit of the modulator with the tubes 234 and 235 is disconnected from the contacts c230 and c231 by the change over contacts e239 and e240.

The circuit 210 may be any well known type of integrating circuit. In the system shown in the drawings a Miller integrater is used for this purpose. It will be described here to show that the output voltage of this circuit actually decreases when the input voltage is increased, and vice versa. If the differential amplifier 205 provides a higher voltage, the grid of the amplifier tube 249 obtains a higher potential, causing the current in the anode resistance of the tube 249 to increase and the anode voltage of the tube to decrease. The latter decrease is applied by means of the voltage divider 250 to the grid of the cathode follower 251, causing the cathode voltage of this tube to be decreased as well. This is, however, only possible if the condenser 248 is charged in a circuit containing the resistance 207 by a current which is determined by the value of this resistance and of the voltage applied to the left hand terminal of this resistance by the differential amplifier. This causes an integration with respect to time to be effected. The decreasing cathode voltage of the tube 251, which is the result of the increased input voltage of the circuit, is the control voltage of the time modulator. It is obvious that in the same way it may be shown that the cathode voltage of the tube 251 increases when the input voltage decreases.

As long as echoes of sufficient strength are received and the relay A225 is deenergized, it is impossible to activate the auxiliary circuit by means of the pressbutton 227, because the contact a211 is open. If the radar apparatus is to be aimed at another target, the synchronization of gating and echo pulses can be disturbed by rotating the handwheel of the device 206. The relay A225 then becomes excited again and the auxiliary circuit can be used to aim the radar apparatus at another target. In the system described this will only be possible for a target which is situated nearer for as long as an echo pulse is superimposed on that part of the wave form furnished by the tube 131 during which the highest voltage occurs, this pulse will pass the threshold tube 219, causing the auxiliary circuit to control a change in the moment of occurrence of the gating pulses. The echo pulses occurring while the voltage wave furnished by the tube 131 is at its lowest value have no influence on the circuit because they are unable to pass the threshold tube. If the circuit has to be suitable for automatically synchronizing the gating pulses with the echo pulses received from a target at a longer range, it must be changed in such a way that the echoes occurring later than the gating pulses will be capable of passing the threshold tube 219. This will, for example, be the case if the wave form produced by the tube 131 is reversed so that the lowest voltage occurs before and the highest after the moment of occurrence of the gating pulses. For this purpose the grid of the cathode follower 131 could be connected to the anode of the tube 124.

The auxiliary circuit cannot be made operative before the relay A225 has attracted its armature. This relay, however, is slow in attracting its armature and especially if a hold-rate circuit is applied and the delay of the relay A225 is fairly large, this may be objectionable. Special measures must then be taken if it has to be possible to break the contact with a target immediately. In the system shown in the drawings special elements are incorporated for this purpose comprising a switch 252 which, when operated, on the one hand makes the relay A225 quick acting by breaking the circuit through the short circuited winding of this relay, and on the other hand applies a positive pulse to the grid of the tube 218 by means of a condenser, causing this tube to become conductive. The capacity of this condenser is such that currents flowing through the resistances in the circuit will not substantially change the grid voltage of the tube 218 before the synchronization of gate and echo pulses is lost.

As has been shown above other forms of the auxiliary circuit according to the invention may be built. If no parts of the time modulator are to be incorporated in the auxiliary circuit, then this auxiliary circuit may comprise a separate trigger circuit. One embodiment of the invention operates with a separate mono-stable trigger circuit, receiving, by way of conductor 115, the pulses initiating the first gating pulse, and reacting to these pulses by passing into the unstable condition. The trigger circuit returns to its stable condition after an interval which is longer than the longest possible interval between a transmitting pulse and an echo pulse for which the radar apparatus is built, but which is shorter than the difference between this interval and the interval between two successive synchronizing pulses. In most radar apparatus the interval between the successive synchronizing pulses is considerably longer than the time it takes for an echo to move to the target and back, so that the above condition can generally be fulfilled. As a rule, in a monostable trigger circuit, a point may be found which possesses a high potential whilst the circuit is in its condition of rest and possesses a low potential when the circuit is in its non stable condition. The anode of a tube in such a circuit through which the anode current is cut off in the condition of rest and receives its anode voltage through a resistance is such a point. The voltage of this point controls the grid circuit of a cathode follower, and if the cathode voltage of this cathode follower is applied to the secondary winding of the transformer 141 instead of the voltage produced by the cathode follower 131 in FIG. 1, an automatic control, similar to that described with reference to the FIGURES 1 and 2, is obtained. This operation will now be described for the synchronization of the electronically controlled gating system. If a video pulse, applied to the conductor 134, occurs before the first gating pulse, the mono-stable trigger circuit which in this case is part of the auxiliary circuit, is still in its condition of rest and applies a high voltage to the secondary winding of transformer 141. In the same way as described with reference to the embodiment of FIGURES 1 and 2, the echo pulse is superposed on the high voltage, and will be able to pass the threshold tube 219, so that a decrease in the delay of the gating pulses is effected. Should a video pulse occur after the first gating pulse, then the mono-stable trigger circuit will be in its non-stable condition, in which it provides a low voltage to the transformer winding. The video pulse will then be superposed on a low voltage by the transformer 141 so that it is unable to pass the threshold tube thus causing the delay of the gating pulses to be increased.

In the first and second embodiment described, only those pulses which are generated in the system itself, such as synchronizing pulses or gating pulses, partake in the control of the auxiliary circuit. The echo pulses are not applied for this control. It is obvious that the task of the echo pulses and one of the other types of pulses generated in the system can be interchanged, and that the auxiliary circuit can be built to react to synchronizing pulses and echo pulses; or to echo pulses only, while instead of the echo pulses, the gating pulses of the gating system to be synchronized are applied to the terminal 134 or to a similar terminal. Synchronizing systems in which the auxiliary circuit only needs to react to pulses produced in the system itself are, however, preferable, because the strength of these pulses is constant and in any case sufficient.

What I claim is:

1. In an apparatus for measuring distance by means of pulse echoes, a gating system for automatically maintaining synchronism of gating pulses and recurrent pulses applied to the system, said gating system comprising, in combination, a generator for recurrent synchronising pulses, a time modulator, a circuit connection between said generator and said time modulator for feeding the synchronising pulses to said time modulator, means in the time modulator to which an adjustable control voltage is applied and which in response to each synchronising pulse supplies an electric signal after a delay interval, determined by the control voltage, has elapsed, a gating pulse generating system, circuit means between the time modulator and the generating system for feeding the signal supplied by the time modulator to said gating pulse generating system, means in the generating system comprising at least one pulse generator which in response to said signal produces two successive gating pulses, a first and a second gating circuit to which the recurrent pulses are applied, circuit means for feeding the first of the two successive gating pulses to the first gating circuit which in response to a coinciding presence of the first gating pulse and a recurrent applied pulse permits passage of the overlapping part of the latter pulse to an output circuit of the first gating circuit, circuit means for feeding the second of the two successive gating pulses to the second gating circuit, which in response to a coinciding presence of the second gating pulse and a recurrent applied pulse permits passage of an overlapping part of the recurrent pulse to an output circuit of the second gating circuit, means for regulating the value of the control voltage of the time modulator, circuit means between the output circuits of the two gating circuits and the regulating means, means in said regulating means for causing the control voltage to be varied in magnitude with the changes in the difference of the energy content of the part of the pulses passing through one of the gating circuits and the part of the pulses passing through the other one of the two gating circuits, an auxiliary means for effecting a state of synchronism of pulses which must afterwards be maintained comprising an auxiliary circuit having two possible conditions and supplying different output voltages in its two conditions, means deriving from one of the said pulses to be synchronized, pulses occurring substantially at the same moment as the pulses from which they are derived, means to which said derived pulses are applied and which in response to such a pulse cause the auxiliary circuit to be switched over to one of its two possible conditions, means for causing the auxiliary circuit to be switched back to the other possible condition before the next pulse of the same type to be synchronized occurs, means for deriving pulses from another of the said pulses to be synchronized and occurring at substantially the same moment as the said other pulses, a superposing circuit to which the pulses derived from the other of the said pulses are fed for superposing said pulses upon the output voltage of the auxiliary circuit, a threshold circuit to which an output voltage of the superposing circuit is applied and which only lets the latter output voltage pass if a pulse is superposed on an output voltage of the auxiliary circuit when the latter output voltage has a value corresponding to a predetermined one of its two possible conditions, circuit means connected from said threshold circuit to the regulating means for determining a control voltage for the time modulator, said determining circuit comprising means for causing said control voltage to be changed in one sense if electric energy passes the threshold circuit and in the other sense if no such energy passes the threshold circuit, and switching means for making said auxiliary means either operative or non operative.

2. In a system according to claim 1, a circuit connection between the generator for recurrent synchronizing pulses and the auxiliary circuit for feeding the synchronizing pulses to said auxiliary circuit, means in said circuit which in response to the synchronizing pulses cause the circuit always to be switched over to the same one of its two possible conditions, means for supplying a pulse occurring in the interval occupied by the two gating pulses and means in said auxiliary circuit to which such pulse is fed and which in response to such a pulse cause said auxiliary circuit always to be switched back to the other one of its two possible conditions.

3. In a system according to claim 1, a circuit connection for feeding the synchronizing pulses to said auxiliary circuit, means in said auxiliary circuit which in response to the synchronizing pulses cause said circuit always to be switched over to the same one of its two possible conditions, means in said circuit for causing it to return automatically to its other possible condition after an interval which is not longer than the interval between two successive synchronizing pulses less the longest interval possible in the system between a synchronizing pulse and the next set of gating pusles, and which is not shorter than the latter interval.

4. In a system according to claim 1, means for deriving the pulses applied to the apparatus from the pulse echoes and causing said applied pulses to occur at substantially the same moment as the echo pulses.

5. In a system according to claim 1, means connected to at least one of the output circuits of the gating circuits, which means in response to energy above a certain level passing through a respective gating circuit to an output circuit thereof cause switching means to make the auxiliary circuit inoperative.

6. In a system according to claim 1, means connected to the output circuits of the gating circuits which means in response to the absence of energy above a certain level passing through said gating circuits to the output circuits thereof cause switching means to make the auxiliary circuit operative.

7. A system according to claim 1 further comprising a first time modulator, a first gating system, an integrating circuit and an auxiliary circuit, a second time modulator, a voltage divider having an adjustable element comprised in the arrangement for regulating the value of the control voltage for the second time modulator and supplying said control voltage to said second time modulator, a second gating system including a gating pulse generating system and first and second gating circuits to which the recurrent applied pulses are fed, a reversible servo motor, a driving connection between said servo motor and the adjustable element of said voltage divider, said first and second gating circuits being connectable to said servo motor for supplying a control voltage for said servo motor to have the servo motor run in a direction determined by the difference in the electrical energy passing through said two gating circuits to the output circuits thereof, connecting means between the second gating system and the said auxiliary circuit for supplying pulses to said auxiliary circuit substantially comprised in the interval occupied by the gating pulses of the second gating system, switching means between the output of said second gating system and said servo motor, said switching means enabling the servo motor to be disconnected from the output of said second gating system and to be connected instead to the output of said auxiliary circuit for supplying another control voltage for the servo motor to have said servo motor run in a direction determined by the relative time position of the gating pulses of the first and second gating systems.

8. In a system according to claim 7, gating circuits in the electronically controlled gating system, means connected to at least one of the output circuits of the gating circuits of the electronically controlled gating system, which means in response to energy above a certain level passing through a gating circuit to an output circuit thereof cause switching means to make the auxiliary circuit operative.

9. In a gating system according to claim 7, a first pulse producing means supplying pulses which are comprised within the interval occupied by the gating pulses of the gating system and a second pulse producing means supplying pulses which are comprised within the interval occupied by the gating pulses of the electronically controlled gating system, and comparing means to which the pulses supplied by the said pulse producing means are applied and which in response to the simultaneous presence of the said pulses causes switching means to make the auxiliary circuit non-operative.

10. In a system according to claim 7, switching means for simultaneously switching over the connections between the auxiliary means and the gating system to which it is connected to the second electronically controlled gating system, as well as switching over the connection for applying the recurrent pulses to the apparatus from the electronically controlled gating system to an arrangement for supplying pulses corresponding to the echo pulses.

References Cited in the file of this patent
UNITED STATES PATENTS

| | | |
|---|---|---|
| 2,776,424 | Lair et al. | Jan. 1, 1957 |
| 2,803,818 | Byrne | Aug. 20, 1957 |
| 2,861,179 | Jacob et al. | Nov. 18, 1958 |